United States Patent
Ikeda et al.

(10) Patent No.: US 11,512,977 B2
(45) Date of Patent: Nov. 29, 2022

(54) REDUNDANT RESOLVER AND ROTATION ANGLE DETECTION DEVICE USING SAME

(71) Applicant: Mitsubishi Electric Corporation, Tokyo (JP)

(72) Inventors: Hiroko Ikeda, Tokyo (JP); Yuji Takizawa, Tokyo (JP); Kazumasa Ito, Tokyo (JP); Shinichi Yamaguchi, Tokyo (JP); Toshihiro Matsunaga, Tokyo (JP); Yosuke Sugino, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 386 days.

(21) Appl. No.: 16/640,276

(22) PCT Filed: Dec. 21, 2017

(86) PCT No.: PCT/JP2017/045866
§ 371 (c)(1),
(2) Date: Feb. 19, 2020

(87) PCT Pub. No.: WO2019/123592
PCT Pub. Date: Jun. 27, 2019

(65) Prior Publication Data
US 2020/0363233 A1 Nov. 19, 2020

(51) Int. Cl.
*H02K 21/16* (2006.01)
*G01D 3/08* (2006.01)
(Continued)

(52) U.S. Cl.
CPC .............. *G01D 3/08* (2013.01); *G01B 7/30* (2013.01); *G01D 5/145* (2013.01); *G01D 5/2046* (2013.01)

(58) Field of Classification Search
CPC ........ G01D 3/08; G01D 5/145; G01D 5/2046; G01B 7/30
See application file for complete search history.

(56) References Cited

U.S. PATENT DOCUMENTS

2004/0027015 A1* 2/2004 Utsumi ................. H02K 19/36
310/68 B
2005/0093538 A1* 5/2005 Nakano ................ G01D 5/2046
324/207.25
(Continued)

FOREIGN PATENT DOCUMENTS

JP 2000018968 A 1/2000
JP 2007-189834 A 7/2007
(Continued)

OTHER PUBLICATIONS

Akira Ishizaki et al., Theory and Characteristics on Novel Variable Reluctance 1X Resolver, vol. 115, Issue No. 5, 1995, pp. 598-604.
(Continued)

*Primary Examiner* — Alesa Allgood
(74) *Attorney, Agent, or Firm* — Sughrue Mion, PLLC; Richard C. Turner

(57) ABSTRACT

A redundant resolver is configured of a stator and a rotor that form a pair, wherein the rotor is a rotor with a shaft angle multiplier of Nx having Nx (Nx is a natural number) salient poles, the stator is such that n teeth T1 to Tn, where n is a natural number, are disposed sequentially in a circumferential direction, configuring M systems by being divided into M in the circumferential direction, and having an angle of 360/M degrees when angles of the teeth configuring one system are totaled, a one-phase excitation winding and a two-phase output winding are wound around each of the teeth T1 to Tn, excitation signals of the same frequency are applied by differing excitation circuits to the respective excitation windings, an output order per system is Nout (Nout is a natural number), and an abnormality is detected based on output signals of the M systems.

15 Claims, 14 Drawing Sheets

(51) Int. Cl.
    *G01D 5/20*     (2006.01)
    *G01B 7/30*     (2006.01)
    *G01D 5/14*     (2006.01)

(56) References Cited

U.S. PATENT DOCUMENTS

| | | | |
|---|---|---|---|
| 2012/0262158 A1 | | 10/2012 | Matsuura et al. |
| 2013/0060518 A1 | | 3/2013 | Nakazato |
| 2013/0277123 A1 | * | 10/2013 | Klatt ........................ B60L 15/20 307/9.1 |
| 2017/0199057 A1 | | 7/2017 | Morita et al. |

FOREIGN PATENT DOCUMENTS

| | | | |
|---|---|---|---|
| JP | 2009098028 | * | 5/2009 |
| JP | 2009098028 | A | 5/2009 |
| JP | 2009-222435 | A | 10/2009 |
| JP | 2009-281818 | A | 12/2009 |
| JP | 2013-53890 | A | 3/2013 |
| JP | 2013-247828 | A | 12/2013 |
| JP | 2015040806 | A | 3/2015 |
| WO | 2007029678 | A1 | 3/2007 |
| WO | 2016027290 | A1 | 2/2016 |

OTHER PUBLICATIONS

Int. Search Report dated Mar. 27, 2018 issued by the Int. Searching Authority in Application No. PCT/JP2017/045866 (PCT/ISA/210).
Office Action dated Jul. 8, 2021 from Indian Patent Office in IN Application No. 202027005278.
Communication dated Apr. 20, 2021, from the Japanese Patent Office in Application No. 2019-559951.
Communication dated Sep. 9, 2021 by the China National Intellectual Property Administration in application No. 201780097762.X.
Communication from the Japanese Patent Office dated Sep. 29, 2020 in Application No. 2019-559951.
Communication dated Nov. 24, 2020, from the European Patent Office in Application No. 17935079.8.

* cited by examiner

REDUNDANT RESOLVER AND ROTATION ANGLE DETECTION DEVICE USING SAME

CROSS REFERENCE TO RELATED APPLICATIONS

This application is a National Stage of International Application No. PCT/JP2017/045866, file Dec. 21, 2017, the contents of all of which are incorporated herein by reference in their entirety.

BACKGROUND OF THE INVENTION

Field of the Invention

The present invention relates to a redundant resolver that utilizes a change in permeance in a gap between a rotor and a stator, and to a rotation angle detection device in which the redundant resolver is used.

Description of the Related Art

In order to achieve redundancy of a resolver used in a rotation angle detection device, a case wherein two resolvers are stacked in two tiers is disclosed in, for example, JP-A-2009-281818 (Patent Literature 1). Also, a redundant resolver including two pairs of stators and rotors in a radial direction is disclosed in, for example, JP-A-2007-189834 (Patent Literature 2) and JP-A-2009-222435 (Patent Literature 3). Furthermore, a redundant resolver wherein an output winding is configured of a first system winding and a second system winding, and the winding of only either one of the systems is wound around one tooth, is disclosed in, for example, JP-A-2013-247828 (Patent Literature 4) and JP-A-2013-53890 (Patent Literature 5). Also, although not specifically disclosing the present invention, research wherein, when both a four-pole excitation winding and a two-pole output winding are provided in a stator, and a rotor form is such that a change in gap permeance with respect to a position in a circumferential direction is appropriate, a two-phase voltage whose amplitude changes in a sinusoidal waveform in accordance with a position of the rotor, with the whole circumference as one cycle, is obtained in the output winding, with the rotor being of a simple structure of only an iron core with no winding, has been announced by Akira Ishizaki and three others in "The Transactions of the Institute of Electrical Engineers of Japan D", 1995, Volume 115, Issue 5, pages 598 to 604, "Theory and Characteristics on Novel Variable Reluctance 1X Resolver" (Non-patent Literature 1).

Patent Literature 1: JP-A-2009-281818
Patent Literature 2: JP-A-2007-189834
Patent Literature 3: JP-A-2009-222435
Patent Literature 4: JP-A-2013-247828
Patent Literature 5: JP-A-2013-53890
Non-patent Literature: "The Transactions of the Institute of Electrical Engineers of Japan D", 1995, Volume 115, Issue 5, pages 598 to 604, "Theory and Characteristics on Novel Variable Reluctance 1X Resolver", Akira Ishizaki and three others The redundant resolver disclosed in Patent Literature 1 is such that two resolvers are configured by stators and rotors thereof being stacked in two tiers via a shaft, because of which there is a problem in that an axial direction dimension increases twofold in comparison with that of a one-system resolver.

Also, the redundant resolver disclosed in Patent Literature 2 and 3 is such that redundancy is achieved by a first system rotor, a first system stator, a second system stator, and a second system rotor being disposed in order from an inner side of the resolver, because of which the stator is duplicated and a number of windings increases. Because of this, there is a problem in that manufacturability worsens, and cost increases.

Furthermore, the redundant resolver disclosed in Patent Literature 4 and 5 is such that a first system output winding and a second system output winding are alternately wound around teeth, because of which there is a problem in that an output signal of one of the systems is not an ideal sinusoidal wave, and angle detection accuracy worsens.

SUMMARY OF THE INVENTION

The invention, having been contrived in order to resolve the aforementioned problems, has an object of providing a redundant resolver such that a worsening of manufacturability and a cost increase are restricted, and angle detection accuracy is improved, while preventing an increase in an axial direction dimension caused by redundancy, and a rotation angle detection device in which the redundant resolver is used.

A redundant resolver according to the invention is characterized by being configured of a rotor and a stator that form a pair, wherein the rotor is a rotor with a shaft angle multiplier of Nx having Nx (Nx is a natural number) salient poles, the stator is such that n teeth, where n is a natural number, are disposed sequentially in a circumferential direction, configuring M systems by being divided into M in the circumferential direction, and having an angle of 360/M degrees when angles of the teeth configuring one system are totaled, a one-phase excitation winding and a two-phase output winding are wound around each of the n teeth, excitation signals of the same frequency are applied by differing excitation circuits to the respective excitation windings, an output order per system is Nout (Nout is a natural number), and an abnormality is detected based on output signals of the M systems.

The redundant resolver according to the invention is of a structure formed of a stator and a rotor that form a pair, wherein redundancy is achieved by dividing the stator in a circumferential direction, and an output order per system is Nout (Nout is a natural number), because of which a worsening of manufacturability and a cost increase are restricted, and angle detection accuracy can be improved, while preventing an increase in an axial direction dimension caused by redundancy.

DETAILED DESCRIPTION OF THE PREFERRED EMBODIMENTS

Hereafter, preferred embodiments of a redundant resolver according to the invention, and a rotation angle detection device in which the redundant resolver is used, will be described in detail with reference to the drawings. In the embodiments, identical or corresponding portions are described using the same reference number, but a redundant description may be omitted in one portion.

First Embodiment

Figure 1:
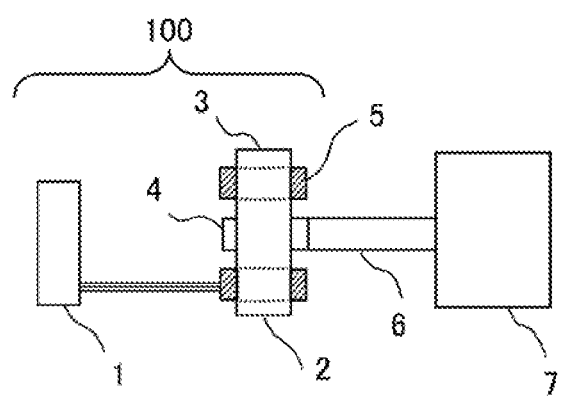
FIG. 1 is a drawing showing a configuration of a rotation angle detection device in which a redundant resolver according to a first embodiment of the invention is used.
Figure 2:
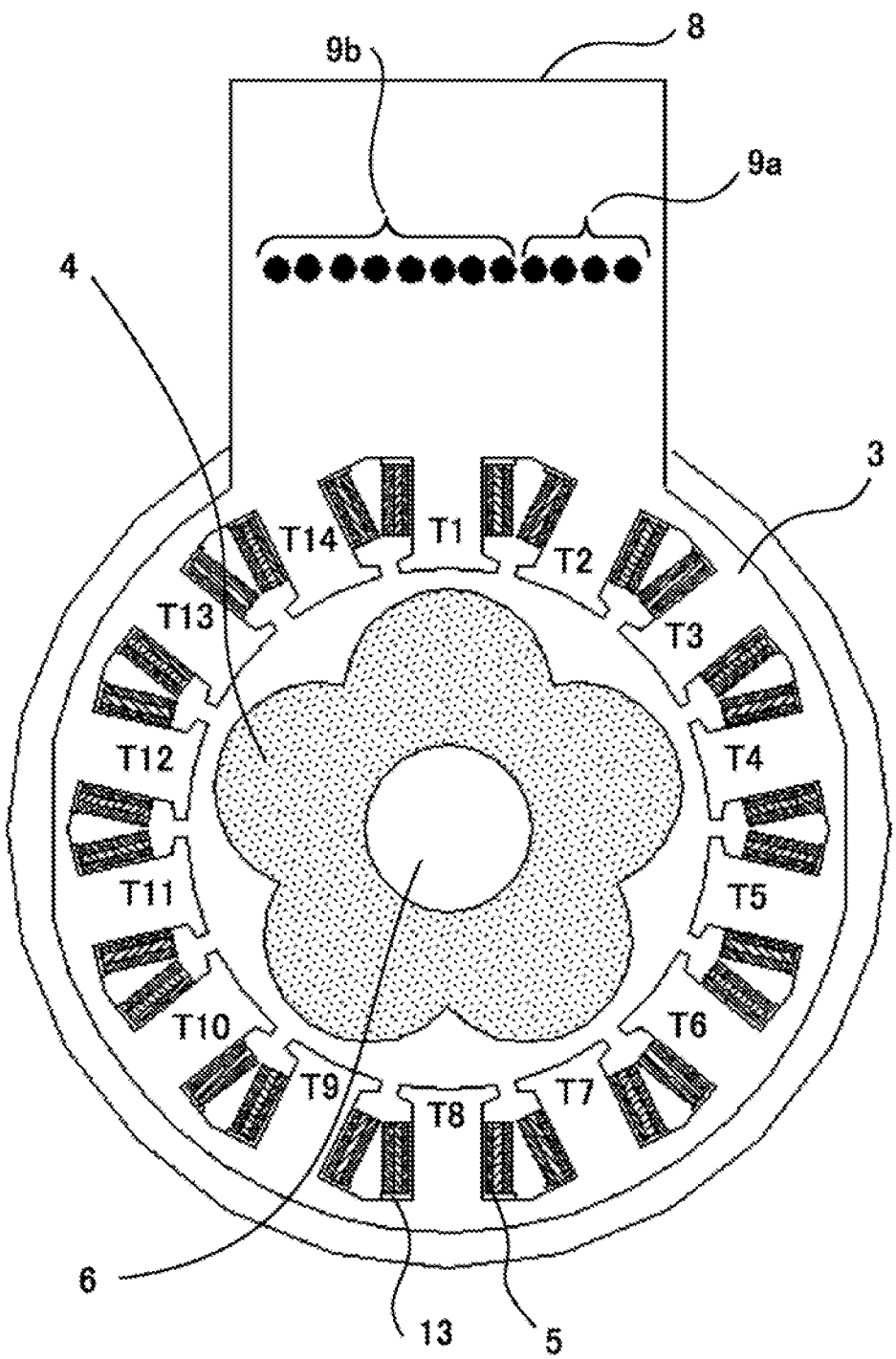
FIG. 2 is a sectional view of the redundant resolver according to the first embodiment of the invention.
Figure 3:
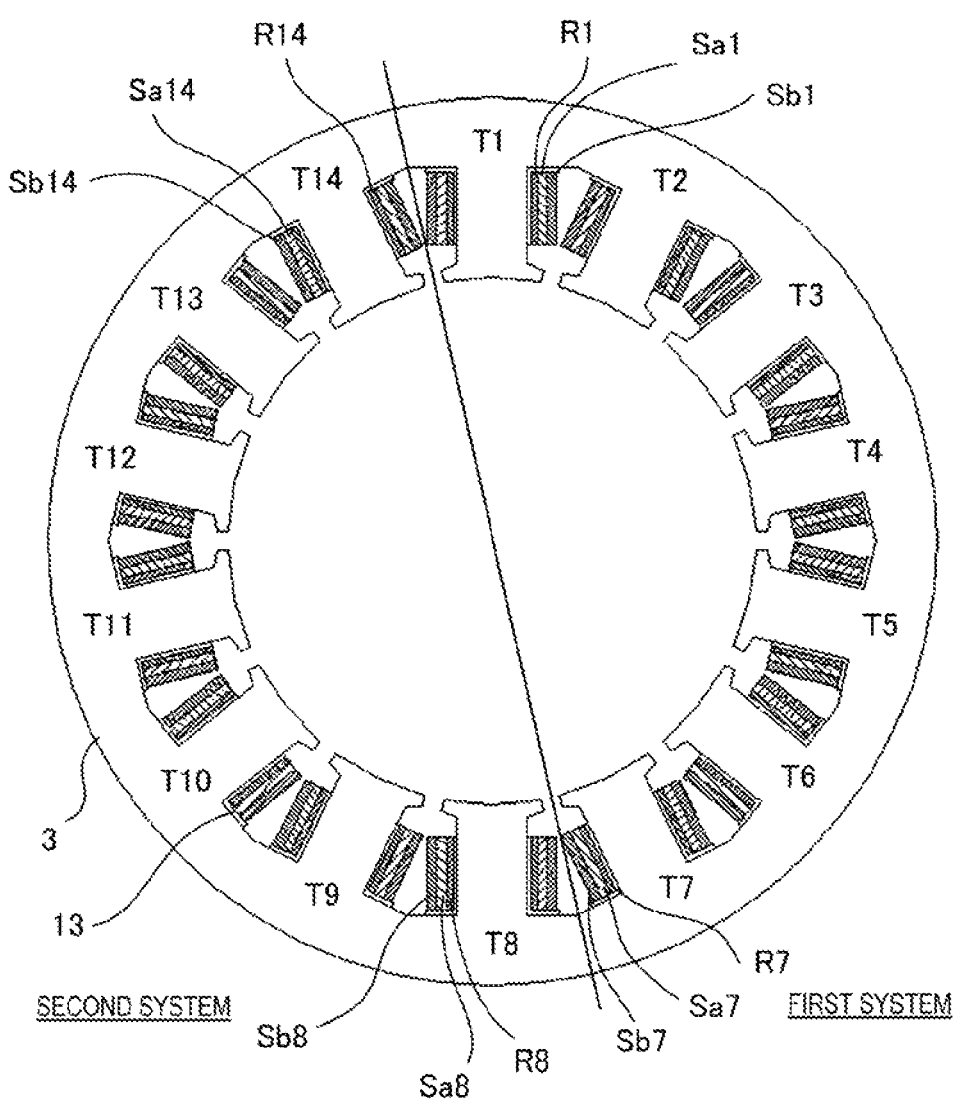
FIG. 3 is a sectional view of a stator of the redundant resolver according to the first embodiment of the invention.
Figure 4:
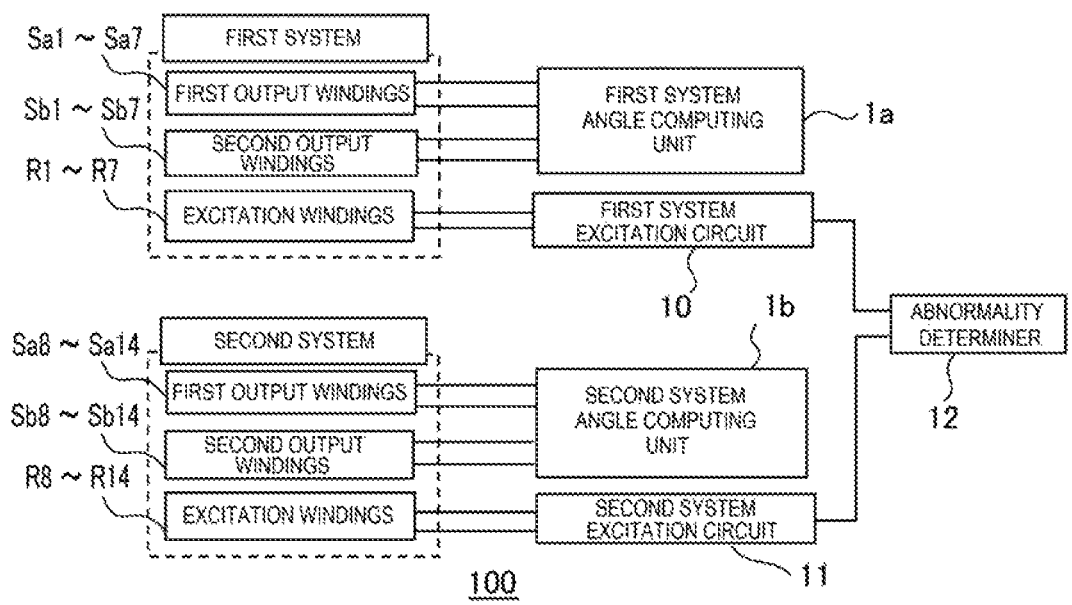
FIG. 4 is a block configuration diagram of the rotation angle detection device in which the redundant resolver according to the first embodiment of the invention is used.

FIG. 1 is a drawing showing a configuration of a rotation angle detection device in which a redundant resolver according to a first embodiment of the invention is used, FIG. 2 is a sectional view of the redundant resolver according to the first embodiment, and FIG. 3 is a sectional view of a stator of the redundant resolver according to the first embodiment. Also, FIG. 4 is a block configuration diagram of the rotation angle detection device in which the redundant resolver according to the first embodiment is used.

As shown in FIG. 1, a rotation angle detection device 100 according to the first embodiment is configured to include an angle computing unit 1 and a redundant resolver (hereafter called simply a resolver) 2. The resolver 2 is configured of a stator 3 and a rotor 4, which form a pair, and the stator 3 includes a winding 5. The rotor 4 of the resolver 2 is connected to a rotating electrical machine 7, or to rotating units of various devices, via a shaft 6.

The resolver 2 is such that a number Ns of teeth T1 to T14 (hereafter, "to" is represented as "~") of the stator 3 is fourteen, and a number Nx of salient poles of the rotor 4 is five, as shown in FIG. 2. The salient pole number Nx is also called a shaft angle multiplier. Also, the teeth T1 to T14 of the stator 3 are divided into two in a circumferential direction, as shown in FIG. 3, configuring a first system and a second system, as shown in FIG. 4, and the resolver 2 configures a dual system redundant resolver. That is, a total angle of teeth per system is 360°/2=180°.

The teeth T1 to T7 of the stator 3 are first system teeth, and the teeth T8 to T14 of the stator 3 are second system teeth, as shown in FIG. 3. A one-phase excitation winding and a two-phase output winding are wound around each tooth. That is, first system excitation windings R1 to R7, first first system output windings Sa1 to Sa7, and second first system output windings Sb1 to Sb7 are wound around the first system teeth T1 to T7, as shown in FIG. 3 and FIG. 4. In the same way, second system excitation windings R8 to R14, first second system output windings Sa8 to Sa14, and second second system output windings Sb8 to Sb14 are wound around the second system teeth T8 to T14.

The first system excitation windings R1 to R7 and the second system excitation windings R8 to R14 are connected to a first system excitation circuit 10 and a second system excitation circuit 11 respectively via an output terminal 9a provided in an extended portion 8 of the resolver 2. The first system excitation circuit 10 and the second system excitation circuit 11 provide alternating current voltage of the same amplitude and frequency to the first system excitation windings R1 to R7 and the second system excitation windings R8 to R14 respectively. The first first system output windings Sa1 to Sa7, the second first system output windings Sb1 to Sb7, the first second system output windings Sa8 to Sa14, and the second second system output windings Sb8 to Sb14 are connected to a first system angle computing unit 1a and a second system angle computing unit 1b respectively via an output terminal 9b provided in the extended portion 8 of the resolver 2. The arrangement of the output terminal 9a and the output terminal 9b is one example, and an arrangement may be arbitrary, such as the output terminal 9a and the output terminal 9b being arranged in reverse laterally, or being arranged alternately, in, for example, FIG. 2.

The first system angle computing unit 1a and the second system angle computing unit 1b calculate and output a first system detected angle θ1 and a second system detected angle θ2 of the rotor 4 based on output voltages of the two-phase output windings Sa1 to Sa7 and Sa8 to Sa14, and Sb1 to Sb7 and Sb8 to Sb14, of the resolver 2. Furthermore, the first system angle computing unit 1a and the second system angle computing unit 1b are each connected to an abnormality determiner 12, and an abnormality such as a failure is detected based on values of the first system detected angle θ1 and the second system detected angle θ2.

The resolver 2 according to the first embodiment is configured in such a way that the one-phase excitation winding, that is, the first system excitation windings R1 to R7 and the second system excitation windings R8 to R14, is wound first around the first system teeth T1 to T7 and the second system teeth T8 to T14 respectively, and the two-phase output winding, that is, the first first system output windings Sa1 to Sa7 and the second first system output windings Sb1 to Sb7, and the first second system output windings Sa8 to Sa14 and the second second system output windings Sb8 to Sb14, is wound on top of the one-phase excitation winding. The first first system output windings Sa1 to Sa7, the second first system output windings Sb1 to Sb7, the first second system output windings Sa8 to Sa14, and the second second system output windings Sb8 to Sb14 may be wound in any order, as may the first system excitation windings R1 to R7 and the second system excitation windings R8 to R14.

Insulation between the windings and an iron core is carried out using an insulator (insulating paper, a coating, or the like) 13. There is a case in which teeth around which either one-phase output winding of the two-phase output winding is not wound are provided among the teeth T1 to T14 of the resolver 2. Insulation between winding phases is carried out using insulating paper or the like. The first system excitation windings R1 to R7 are connected in series, and the first first system output windings Sa1 to Sa7 and the second first system output windings Sb1 to Sb7 are also connected in series. In the same way, the second system excitation windings R8 to R14 are connected in series, and the first second system output windings Sa8 to Sa14 and the second second system output windings Sb8 to Sb14 are also connected in series.

Herein, it is assumed that the respective windings are connected in series in order of the teeth T1 to T7. However, even if first wound teeth are arbitral teeth, respectively and adjacent teeth are connected in order in series, the same advantage can be obtained.

According to this kind of configuration, redundancy can be achieved with an axial direction dimension equivalent to that of a normal one-system angle detection device. Also, an increase in a number of coils can be restricted, because of which advantages are obtained in that manufacturing is easy, and a cost increase can be restricted.

Also, the resolver 2 according to the first embodiment is such that a one-phase excitation winding and a two-phase output winding are wound aligned in the circumferential direction, but not being limited to this, the same advantages can be obtained by aligning in a radial direction, or changing a winding order for each tooth.

Figure 5:
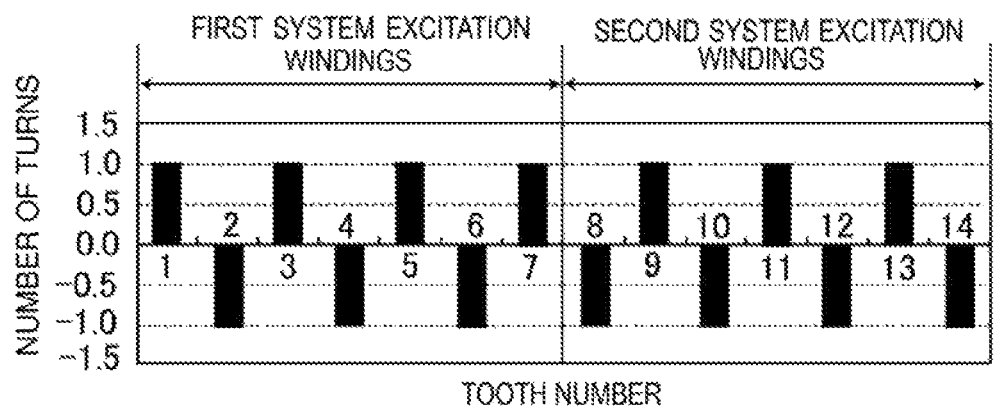
FIG. 5 is a drawing showing numbers of turns of excitation windings of the redundant resolver according to the first embodiment of the embodiment.

FIG. 5 is a drawing showing a turn number distribution of the first system excitation windings R1 to R7 and the second system excitation windings R8 to R14 of the resolver 2 according to the first embodiment. In FIG. 5, the numbers of turns of the first system excitation windings R1 to R7 and the second system excitation windings R8 to R14 wound around the first system teeth T1 to T7 and the second system teeth T8 to T14 respectively are shown consecutively.

Generally, a winding direction (+) and a winding direction (−) are defined for a resolver excitation winding. When a direction of a winding of a certain coil is represented by the winding direction (+), a coil wherein the winding is wound in the reverse direction is expressed as the winding direction (−). Absolute values of a number of turns in the winding direction (+) and a number of turns in the winding direction (−) are the same. That is, when the number of turns in the winding direction (+) is +X turns, the number of turns in the winding direction (−) is −X turns. The number of turns of an excitation winding is standardized by the amplitude of the number of turns.

The resolver 2 according to the first embodiment is such that excitation windings are repeatedly wound Ne times around the stator 3, wherein the first system teeth T1 to T7 and the second system teeth T8 to T14 are combined, in units of two teeth, a (+) and a (−). That is, as the number of teeth T1 to T14 of the stator 3 is fourteen, a spatial order of the excitation windings is Ne=7. Therefore, a spatial order Ne1 of the first system excitation windings R1 to R7 is 3.5, and a spatial order Ne2 of the second system excitation windings R8 to R14 is 3.5.

The resolver 2 according to the first embodiment is such that an excitation order per system is N±0.5 (N is a natural number), and the shaft angle multiplier is an odd number.

According to this kind of configuration, a magnetic flux that interlinks in a gap between the stator 3 and the rotor 4 can have a sinusoidal waveform, because of which rotation angle detection accuracy can be improved.

Also, an example wherein excitation windings are repeatedly wound Ne times around the stator 3, wherein the first system teeth T1 to T7 and the second system teeth T8 to T14 are combined, in units of two teeth, a (+) and a (−), has been described here, but not being limited to this, the same advantages can be obtained when excitation winding (+) and (−) are repeated with a factor of the number of teeth of the stator 3 as one unit.

Figure 6:
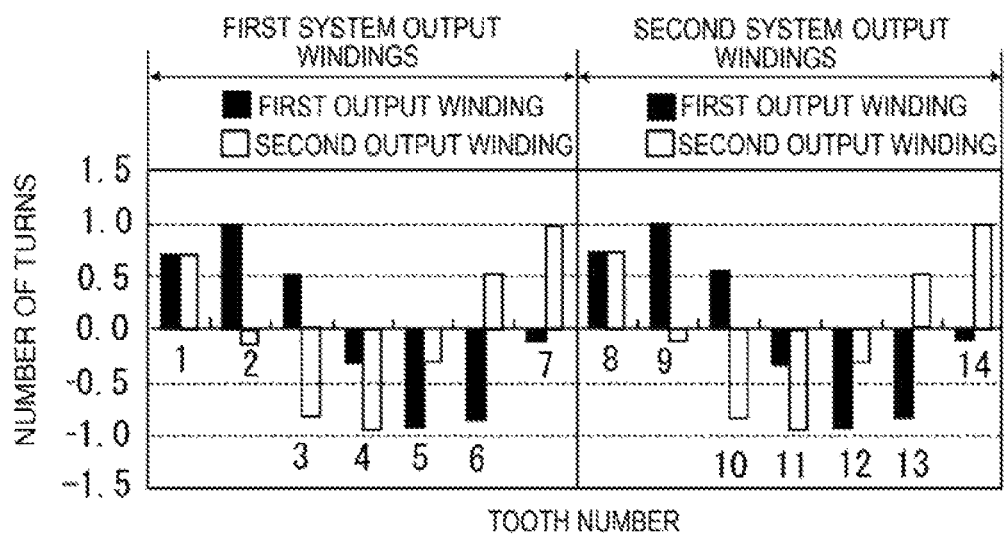
FIG. 6 is a drawing showing numbers of turns of output windings of the redundant resolver according to the first embodiment of the embodiment.

FIG. 6 is a drawing showing a turn number distribution of the first first system output windings Sa1 to Sa7, the second first system output windings Sb1 to Sb7, the first second system output windings Sa8 to Sa14, and the second second system output windings Sb8 to Sb14. Herein, in FIG. 6, the numbers of turns of the output windings wound around the first system teeth T1 to T7 and the second system teeth T8 to T14 are shown consecutively. A number of turns $N_{Sa1i}$ of the first first system output winding and a number of turns $N_{Sb1i}$ of the second first system output winding wound around an $i^{th}$ tooth can each be expressed by Equation (1). Also, a number of turns $N_{Sa1i}$ of the first second system output winding and a number of turns $N_{Sb2i}$ of the second second system output winding can be expressed by the same kind of equation as the number of turns $N_{Sa1i}$ of the first first system output winding and the number of turns $N_{Sb1i}$ of the second first system output winding.

Math. 1

$$N_{Sa1i} = N_1 \sin\left\{(N_e \pm N_x)\frac{1}{N_s}2(i-1)\pi + \theta_{teeth}\right\} \quad \text{(Equation 1)}$$

$$N_{Sb1i} = N_1 \cos\left\{(N_e \pm N_x)\frac{1}{N_s}2(i-1)\pi + \theta_{teeth}\right\}$$

Herein, $N_1$ is the amplitude of the number of turns of the output winding, and $\theta_{teeth}$ represents a circumferential direction position of the tooth.

The output windings are distributed in a sinusoidal waveform in the circumferential direction of the teeth. When the number of turns is a decimal number, this is changed to an integer by rounding down or rounding up. In FIG. 6, the number of turns of an output winding is standardized by the amplitude thereof, that is, by $N_1$.

When the number of pole pairs of the first system excitation windings R1 to R7 and the second system excitation windings R8 to R14 is Ne, and the number of salient poles of the rotor 4 is Nx, magnetomotive force is of a space Ne order, and gap permeance is of an Nx order. Herein, the space A order represents a component of an A cycle within a mechanical angle of 360 degrees. The number of pole pairs Ne is the number of magnetic pole pairs of the stator 3. A magnetic flux is generated in a gap by an alternating excitation current flowing into the first system excitation windings R1 to R7 and the second system excitation windings R8 to R14 of the resolver 2, the magnetic flux interlinks with each output winding, and a voltage is generated in the first first system output windings Sa1 to Sa7, the second first system output windings Sb1 to Sb7, the first second system output windings Sa8 to Sa14, and the second second system output windings Sb8 to Sb14. When the position of the rotor 4 changes, the gap permeance changes, and a voltage change occurs in the first first system output windings Sa1 to Sa7, the second first system output windings Sb1 to Sb7, the first second system output windings Sa8 to Sa14, and the second second system output windings Sb8 to Sb14.

Angle detection is carried out from the output winding wound around each tooth. An envelope curve thereof is called output voltage. A magnetic flux density of a gap can be expressed by the product of magnetomotive force and gap permeance. As both magnetomotive force and permeance are trigonometric functions, the magnetic flux density is in the order of the trigonometric function of the product of the two. That is, it is seen from a trigonometric function product-sum expression that the spatial order of the magnetic flux density of the gap is |Ne±Nx|. Herein, |X| represents an absolute value of X. When the spatial order of the magnetic flux density of the gap and the spatial order of the output winding coincide, output winding interlinkage flux is generated from the orthogonality of the trigonometric functions. As the excitation current is an alternating current, voltage is generated in the output winding, and the angle can be detected.

As previously mentioned, magnetic flux of a spatial order equivalent to |Ne±Nx|, of magnetic flux generated in a gap, needs to be picked up in order to function as the resolver 2. This is also mentioned in, for example, page 599, "2-1: Principles" of Non-patent Literature 1. As is understood from Equation (7) of Non-patent Literature 1, what changes in accordance with a rotation angle φ is equivalent to |Ne±Nx|. Equation 2 below shows Equation (7) of Non-patent Literature 1, to which remarks have been added.

Math. 2

$$B = \frac{\sqrt{6}\,W_e k_{w1} I}{4\pi} P_{01}\,\sin(\theta_1 + \psi)\cos(\omega t) + \frac{\sqrt{6}\,W_e k_{w1} I}{2\pi} P_{00}\,\sin(2\theta_1)\cos(\omega t) + \frac{\sqrt{6}\,W_e k_{w1} I}{4\pi} P_{01}\,\sin(3\theta_1 - \psi)\cos(\omega t).$$ (Equation 2)

The components of Equation 2 are as below:
B: magnetic flux density,
$W_e$: total number of excitation winding turns,
$K_{o1}$: winding coefficient with respect to fundamental wave,
I: effective value of excitation current,
$\theta_1$: coordinate set for stator, with origin in center of intermediate tooth of two neighboring excitation winding coils,
ψ: angle between origins of stator and rotor coordinates when rotor is stationary,
$P_{00}$: gap between stator and rotor is gap permeance per unit area in minimum position,
$P_{01}$: gap permeance per unit area when gap between stator and rotor is in other than minimum position.

That is, the resolver 2 in the first embodiment is such that the gap magnetic flux density necessary for angle detection is |7±5 1|=second order or twelfth order (equivalent to second order). Herein, a relationship of |2±Ns|=twelfth order is established between the second order and the twelfth order, which are the spatial orders of the gap magnetic flux density, because of which it can be said that the second and twelfth spatial orders of the gap magnetic flux density are equal. That is, in order to detect the rotation angle of the rotor 4, it is necessary for the output windings to pick up one of the second or twelfth spatial orders, and herein, the rotation angle of the rotor 4 is detected with the second order as the spatial order of the output windings.

Figure 7:
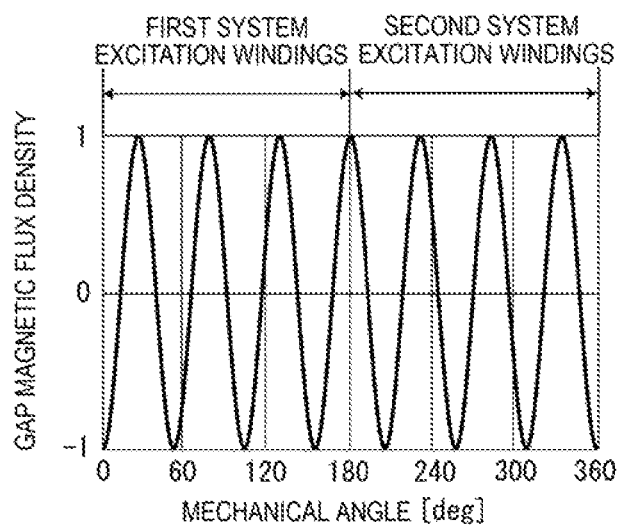
FIG. 7 is a drawing showing gap magnetic flux densities of the redundant resolver according to the first embodiment of the invention.

FIG. 7 shows, in simplified form, gap magnetic flux densities according to excitation signals applied to the first system excitation windings R1 to R7 and the second system excitation windings R8 to R14 of the resolver 2 according to the first embodiment. Also, FIG. 8 shows, consecutively and in simplified form, the number of turns of an output winding of the first system and the second system.

Figure 8:
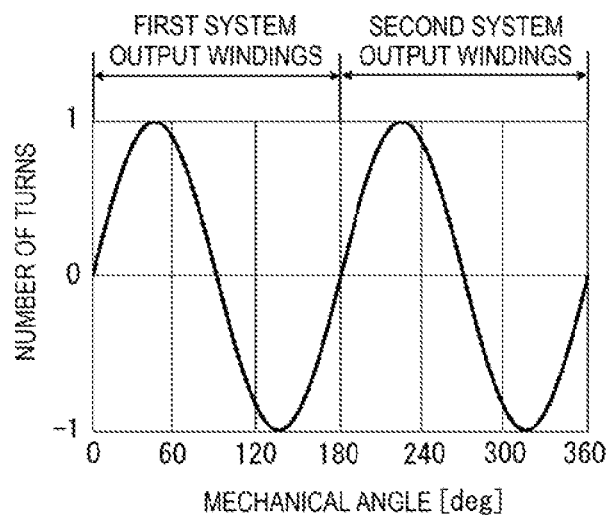
FIG. 8 is a drawing showing output windings of the redundant resolver according to the first embodiment of the invention.

In FIG. 7 and FIG. 8, the mechanical angle, which is on the horizontal axis, is such that a range of 0 to 180° represents the first system, and a range of 180 to 360° represents the second system. The resolver 2 is such that an angle is detected by magnetic flux interlinking in a gap being read by an output winding. Because of this, magnetic flux interlinking in the output windings can be calculated by multiplying the spatial interlinkage flux by the number of turns.

Figure 9:
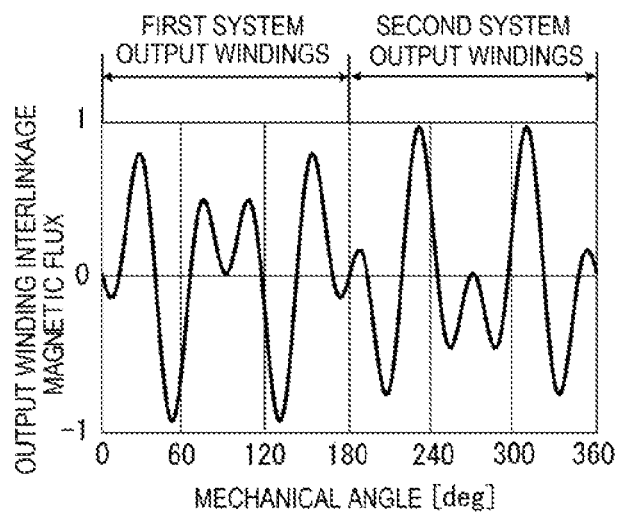
FIG. 9 is a drawing showing output winding interlinkage flux of the redundant resolver according to the first embodiment of the invention.

The magnetic flux interlinking in the output windings when the spatial interlinkage flux of FIG. 7 is read by the number of turns of FIG. 8 is shown in FIG. 9. The waveform of the magnetic flux interlinking in the first system output windings of FIG. 9 and the waveform of the magnetic flux interlinking in the second system output windings are inverted. Because of this, offsets with opposite reference signs overlap in output signals from the first system output windings and the second system output windings. When the offsets are corrected in the angle computing unit 1, the rotation angle can be accurately detected.

The resolver 2 in the first embodiment is such that a first system rotation angle, that is, the first system detected angle θ1, and a second system rotation angle, that is, the second system detected angle θ2, calculated based on the output signals from the first system output windings Sa1 to Sa7 and Sb1 to Sb7 and the output signals from the second system output windings Sa8 to Sa14 and Sb8 to Sb14 are mutually monitored in the abnormality determiner 12, and an abnormality is detected when a failure such as a disconnection or a short-circuit occurs in an interior of the resolver 2.

Specifically, the resolver 2 has thresholds α and β in the abnormality determiner 12. When a relationship between the first system detected angle θ1 calculated based on the first system output signal and the second system detected angle θ2 calculated based on the second system output signal satisfies θ1+θ2>α or θ1−θ2>β, the abnormality determiner 12 determines that an abnormality such as a disconnection or a short-circuit has occurred in the interior of the resolver 2.

Further, when a failure occurs in the first system of the resolver 2, the application of an excitation signal to the first system excitation windings R1 to R7 is stopped. According to this kind of configuration, the failed first system is stopped, and the rotation angle can be detected in the same way as at a normal time based on the output signal of the normal second system. In the same way, when a failure occurs in the second system of the resolver 2, the application of an excitation signal to the second system excitation windings R8 to R14 is stopped, whereby an advantage is obtained in that the rotation angle can be detected in the same way as at a normal time based on the output signal of the normal first system.

Heretofore, it has been assumed that there are fourteen slots and that the shaft angle multiplier is five, but this not being limiting, the same advantages can be obtained with other configurations.

Second Embodiment

Next, a rotation angle detection device in which a redundant resolver according to a second embodiment of the invention is used will be described.

Figure 10:
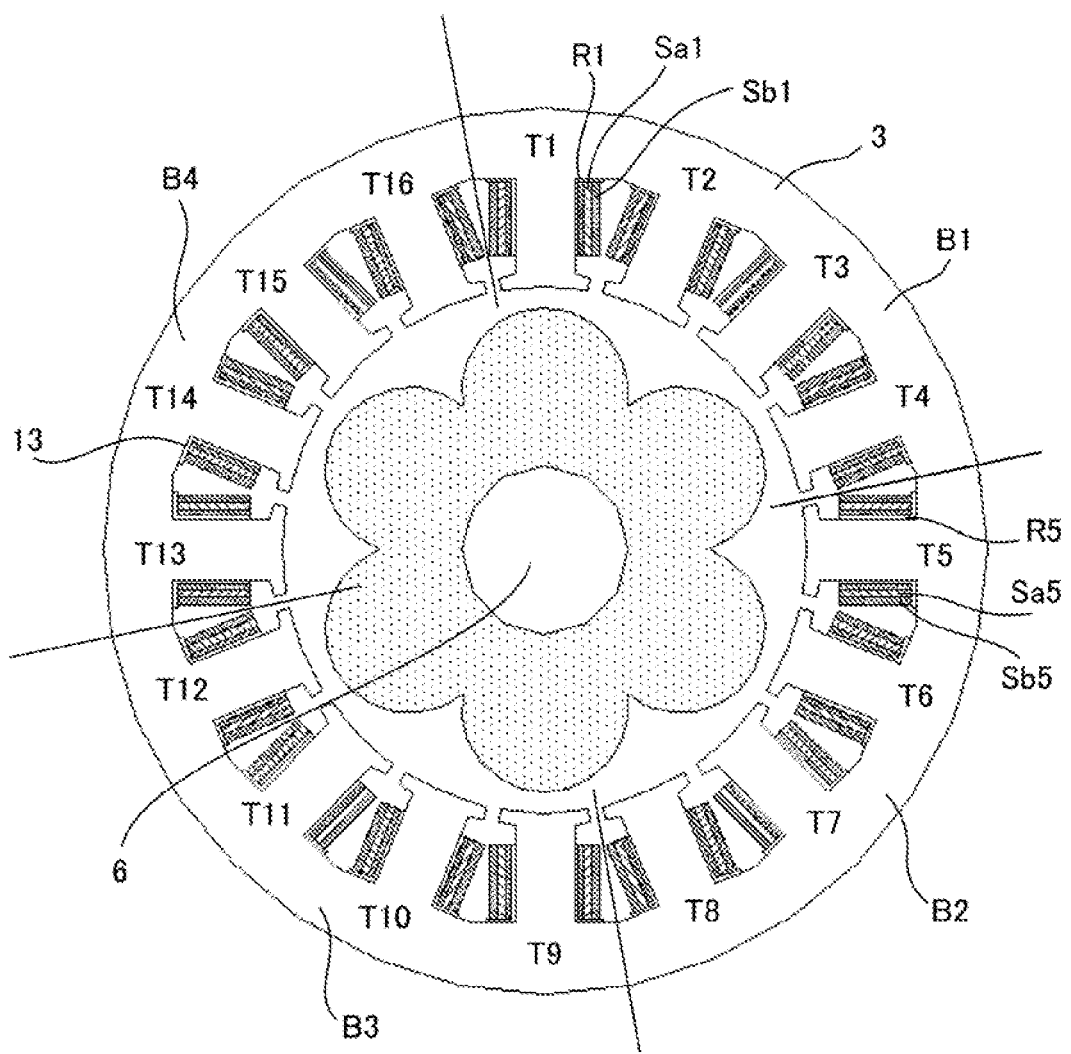
FIG. 10 is a sectional view of a redundant resolver according to a second embodiment of the invention.

FIG. 10 is a sectional view of the resolver 2 used in the rotation angle detection device 100 according to the second embodiment, wherein the number Ns of teeth of the stator 3 is sixteen, and the shaft angle multiplier Nx of the rotor 4 is six.

As shown in FIG. 10, teeth T1 to T16 of the stator 3 are divided in four in a circumferential direction, and are configured of a first system first block B1, a second system first block B2, a first system second block B3, and a second system second block B4. The first system first block B1 and the first system second block B3 configure first system windings wherein windings wound around the teeth T1 to T4 and T9 to T12 of the respective blocks are connected in series. In the same way, the second system first block B2 and the second system second block B4 configure second system windings wherein windings wound around the teeth T5 to T8 and T13 to T16 of the respective blocks are connected in series, and the resolver 2 configures a dual system redundant resolver.

According to this kind of configuration, teeth configuring one system are disposed in opposing positions, because of which an imbalance in magnetic flux when the stator 3 is eccentric is moderated, an output signal is of a sinusoidal waveform, and angle detection accuracy can be improved.

Figure 11:
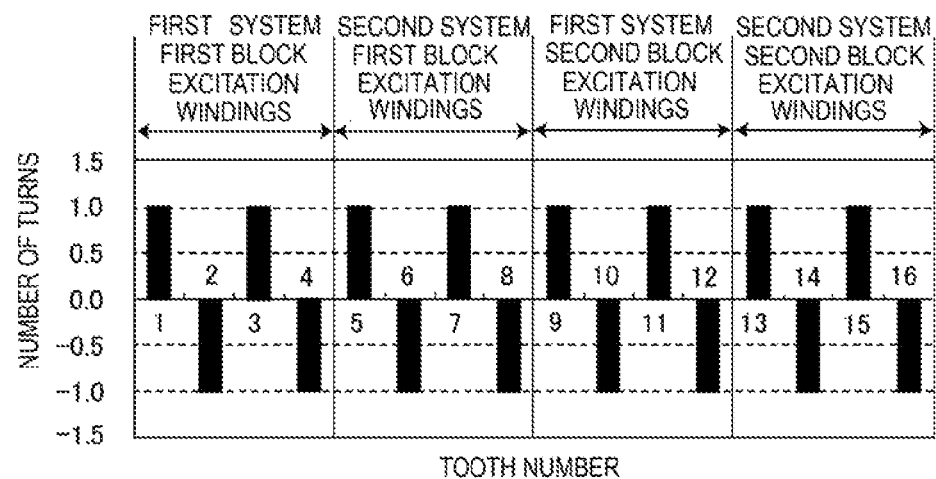
FIG. 11 is a drawing showing numbers of turns of excitation windings of the redundant resolver according to the second embodiment of the invention.

FIG. 11 is a drawing showing a turn number distribution of first system excitation windings and second system excitation windings of the resolver 2 according to the second embodiment. Herein, in FIG. 11, the numbers of turns of the excitation windings wound around the first system teeth T1 to T4 and T9 to T12 and the second system teeth T5 to T8 and T13 to T16 are shown consecutively.

Generally, a winding direction (+) and a winding direction (−) are defined for a resolver excitation winding. When a direction of a winding of a certain coil is represented by the winding direction (+), a coil wherein the winding is wound in the reverse direction is expressed as the winding direction (−). Absolute values of a number of turns in the winding direction (+) and a number of turns in the winding direction (−) are the same. That is, when the number of turns in the winding direction (+) is +X turns, the number of turns in the winding direction (−) is −X turns. The number of turns of an excitation winding is standardized by the amplitude of the number of turns.

The resolver 2 according to the second embodiment is such that excitation windings are repeatedly wound Ne times around the stator 3, wherein the first system teeth T1 to T4 and T9 to T12 and the second system teeth T5 to T8 and T13 to T16 are combined, in units of two teeth, a (+) and a (−). That is, as the number of teeth of the stator 3 is sixteen, a spatial order of the excitation windings is Ne=8. Therefore, a spatial order Ne1 of the first system excitation windings is 4, and a spatial order Ne2 of the second system excitation windings is 4.

The resolver 2 according to the second embodiment is such that an excitation order per system is N (N is a natural number), and the shaft angle multiplier is an even number.

According to this kind of configuration, a magnetic flux that interlinks in a space between the stator 3 and the rotor 4 can have a sinusoidal waveform, because of which there is an advantage in that rotation angle detection accuracy can be improved.

Herein, it has been assumed that there are sixteen slots and that the shaft angle multiplier is six, but this not being limiting, the same advantages can be obtained with other configurations.

Also, in the same way as in the first embodiment, the resolver 2 according to the second embodiment also has the thresholds α and β in the abnormality determiner 12, and when the relationship between the first system detected angle θ1 calculated based on the first system output signal and the second system detected angle θ2 calculated based on the second system output signal satisfies θ1+θ2>α or θ1−θ2>β, the abnormality determiner 12 can determine that an abnormality such as a disconnection or a short-circuit has occurred in the interior of the resolver 2.

Third Embodiment

Next, a rotation angle detection device in which a redundant resolver according to a third embodiment of the invention is used will be described.

Figure 12:
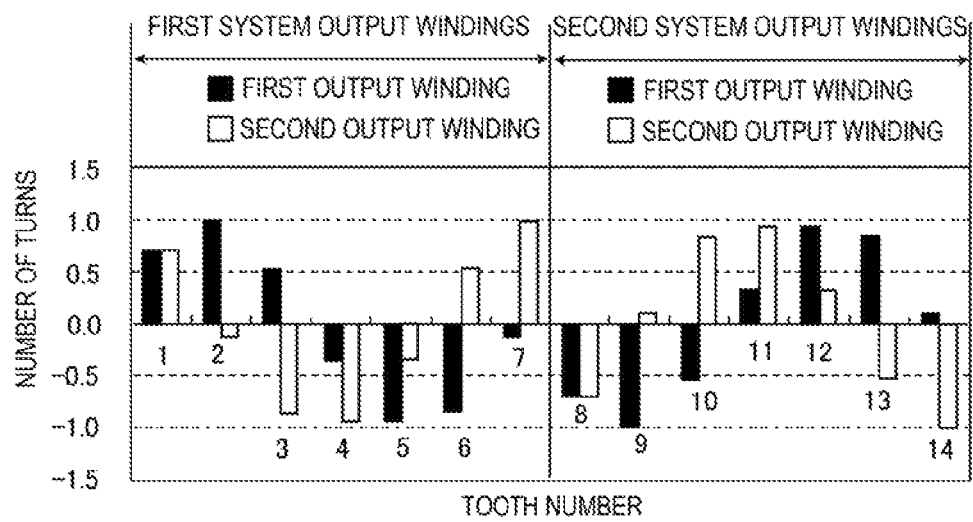
FIG. 12 is a drawing showing numbers of turns of output windings of a redundant resolver according to a third embodiment of the invention.

FIG. 12 is a drawing showing a turn number distribution of first first system output windings, second first system output windings, first second system output windings, and second second system output windings of the resolver 2 used in the rotation angle detection device according to the third embodiment.

In the same way as in FIG. 3 described in the first embodiment, the stator 3 of the resolver 2 according to the third embodiment is configured so that the number Ns of teeth is fourteen, wherein the teeth T1 to T7 form first system teeth and the teeth T8 to T14 form second system teeth, and a one-phase excitation winding and a two-phase output winding are wound around each tooth. That is, the first system excitation windings R1 to R7, the first first system output windings Sa1 to Sa7, and the second first system output windings Sb1 to Sb7 are wound around the first system teeth T1 to T7. In the same way, the second system excitation windings R8 to R14, the first second system output windings Sa8 to Sa14, and the second second system output windings Sb8 to Sb14 are wound around the second system teeth T8 to T14.

In FIG. 12, the numbers of turns of the output windings wound around the first system teeth T1 to T7 and the second system teeth T8 to T14, that is, the first first system output windings Sa1 to Sa7, the second first system output windings Sb1 to Sb7, the first second system output windings Sa8 to Sa14, and the second second system output windings Sb8 to Sb14, are shown consecutively.

Also, the resolver 2 according to the third embodiment is such that winding directions of the first first system output windings Sa1 to Sa7 and second first system output windings Sb1 to Sb7 and the first second system output windings Sa8 to Sa14 and second second system output windings Sb8 to Sb14 wound around the first system teeth T1 to T7 and the second system teeth T8 to T14 are mutually opposed. That is, reference signs of the numbers of turns of the first first system output windings Sa1 to Sa7 and the first second system output windings Sa8 to Sa14 are opposites. In the same way, reference signs of the numbers of turns of the second first system output windings Sb1 to Sb7 and the second second system output windings Sb8 to Sb14 are opposites.

Figure 13:
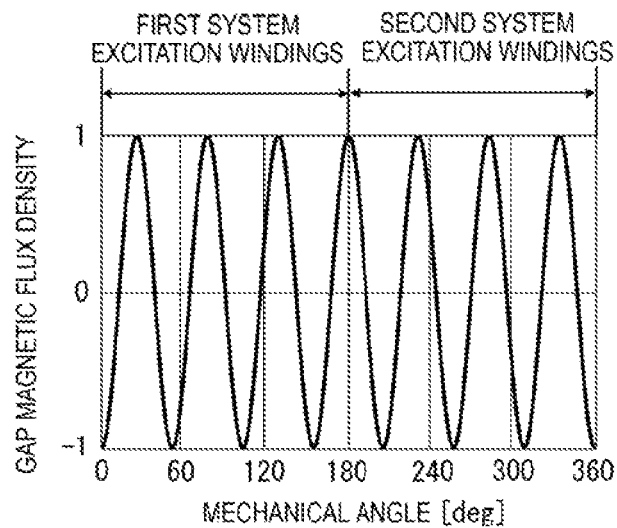
FIG. 13 is a drawing showing gap interlinkage flux density of the redundant resolver according to the third embodiment of the invention.
Figure 14:
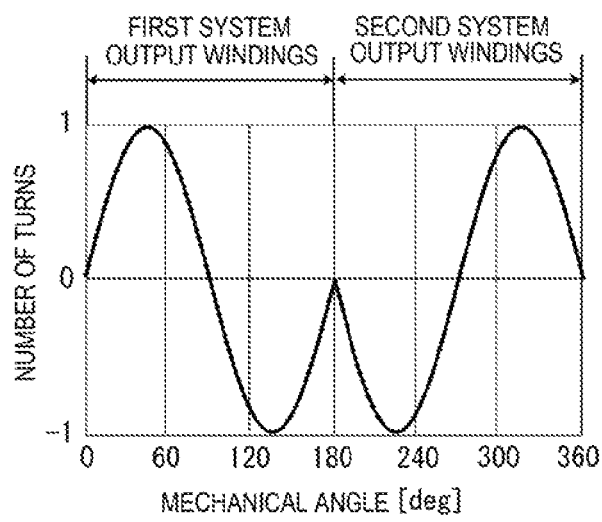
FIG. 14 is a drawing showing output windings of the redundant resolver according to the third embodiment of the invention.

FIG. 13 shows, in simplified form, gap magnetic flux densities according to excitation signals applied to the first system excitation windings R1 to R7 and the second system excitation windings R8 to R14 of the resolver 2 according to the third embodiment. FIG. 14 shows, consecutively and in simplified form, the number of turns of an output winding of the first system and the second system, that is, the number of turns of one of the first first system output windings Sa1 to Sa7, the second first system output windings Sb1 to Sb7, the first second system output windings Sa8 to Sa14, or the second second system output windings Sb8 to Sb14.

In FIG. 13 and FIG. 14, the mechanical angle, which is on the horizontal axis, is such that a range of 0 to 180° represents the first system, and a range of 180 to 360° represents the second system.

Generally, a resolver is such that an angle is detected by magnetic flux interlinking in a gap being read by an output winding. Because of this, magnetic flux interlinking in the output windings can be calculated by multiplying the spatial interlinkage magnetic flux by the number of turns.

Figure 15:
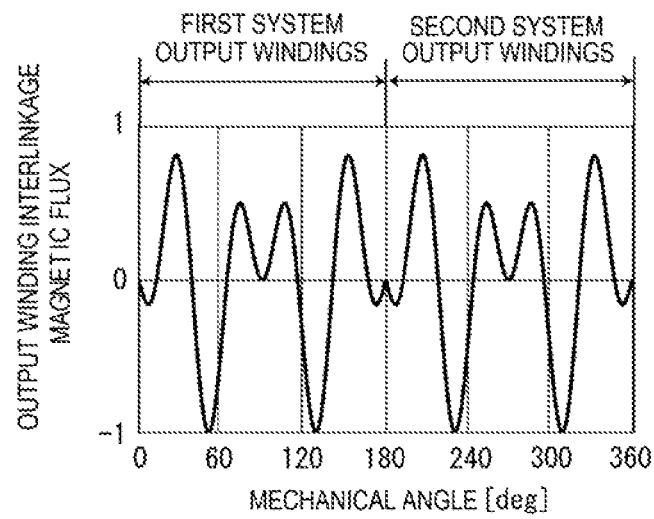
FIG. 15 is a drawing showing output winding interlinkage flux of the redundant resolver according to the third embodiment of the invention.

The magnetic flux interlinking in the output windings when the spatial interlinkage magnetic flux of FIG. 13 is read by the number of turns of FIG. 14 is shown in FIG. 15. The waveform of the magnetic flux interlinking in the first first system output windings Sa1 to Sa7 and the second first system output windings Sb1 to Sb7, which are the first system output windings of FIG. 15, and the waveform of the magnetic flux interlinking in the first second system output windings Sa8 to Sa14 and the second second system output windings Sb8 to Sb14, which are the second system output windings, are the same. Because of this, offsets with coinciding reference signs overlap in output signals from the first system output windings and the second system output windings. When the offsets are corrected in the angle computing unit 1, the rotation angle can be accurately detected. According to this kind of configuration, there is an advantage in that detecting an abnormality becomes easier.

Heretofore, a case wherein the resolver 2 is such that the number Ns of teeth of the stator 3 shown in FIG. 3 described in the first embodiment is fourteen, and the teeth T1 to T14 are divided in two in the circumferential direction, has been described as an example. In the third embodiment, however, the resolver 2 such that the number Ns of teeth of the stator 3 shown in FIG. 10 described in the second embodiment is sixteen, and the teeth T1 to T16 are divided in four in the circumferential direction, is also applicable.

Fourth Embodiment

Next, a rotation angle detection device in which a redundant resolver according to a fourth embodiment of the invention is used will be described.

Figure 16:
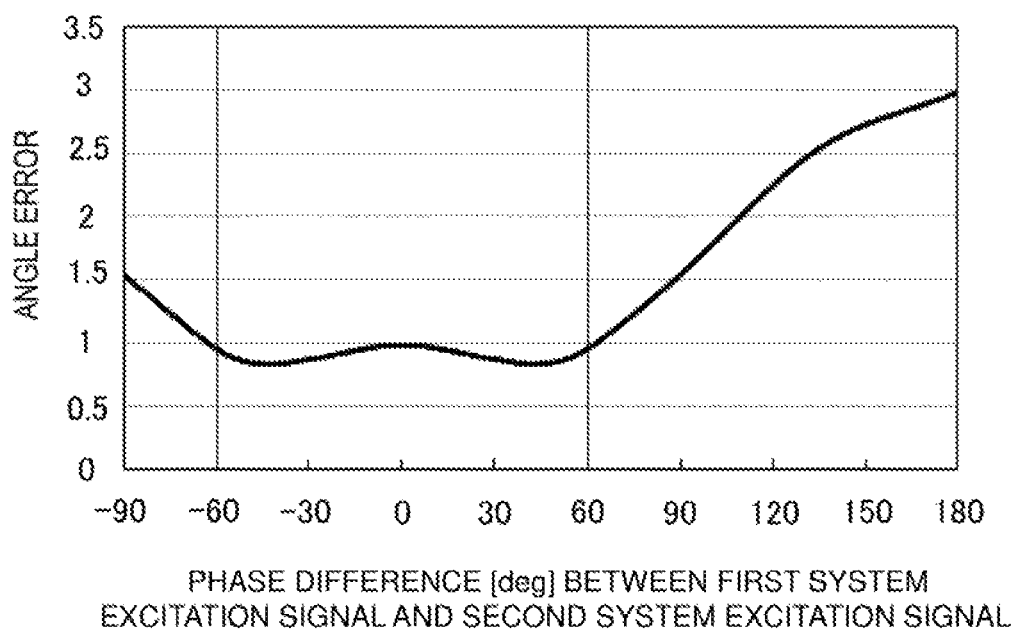
FIG. 16 is a drawing showing a relationship between an excitation signal phase difference and an angle error of a redundant resolver according to a fourth embodiment of the invention.

FIG. 16 is a drawing showing a relationship between an angle error and a phase difference between a first system excitation signal and a second system excitation signal of the resolver 2 used in the rotation angle detection device according to the fourth embodiment.

Herein, an angle error is the difference between an angle detected by the resolver 2 and a true value of the rotation angle of the rotor 4, wherein a small angle error indicates that angle detection accuracy is good. The angle errors of FIG. 16 are shown standardized by a value when the phase difference is 0°. When the phase difference between the two excitations signals is within 60°, angle detection accuracy of an extent equivalent to that when the phase difference is 0° is obtained.

Also, the angle error is smallest when the phase difference is 45°. That is, by restricting the phase difference between the first system excitation signal and the second system excitation signal to 60° or less, an advantage of improving angle detection accuracy can be obtained. Also, the phase difference between the first system excitation signal and the second system excitation signal is desirably synchronized at 0° for practical purposes.

Fifth Embodiment

Next, a rotation angle detection device in which a redundant resolver according to a fifth embodiment of the invention is used will be described.

Figure 17:
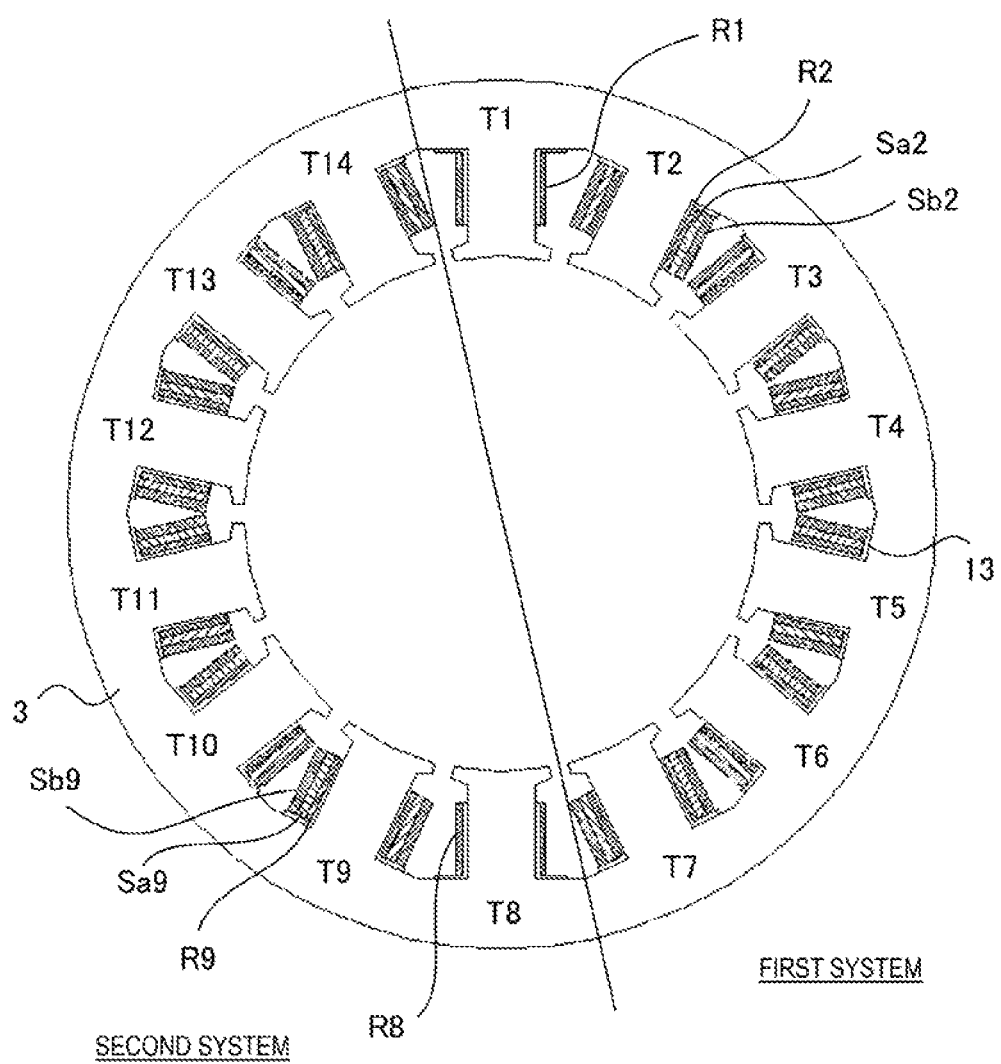
FIG. 17 is a sectional view of a stator of a redundant resolver according to a fifth embodiment of the invention.

FIG. 17 is a sectional view showing the stator 3 of the resolver 2 used in the rotation angle detection device according to the fifth embodiment.

The teeth T1 to T14 of the stator 3 according to the fifth embodiment are divided in two in the circumferential direction, configuring a first system and a second system, whereby a dual system redundant resolver is configured. That is, the total angle of teeth per system is 360°/2=180°.

The teeth T1 to T7 of the stator 3 are the first system teeth, and the teeth T8 to T14 of the stator 3 are the second system teeth. Of the first system teeth T1 to T7 and the second system teeth T8 to T14, the tooth T1 and the tooth T8 are auxiliary teeth around which only an excitation winding is wound, with no output winding being wound. A one-phase excitation winding and a two-phase output winding are wound around the other teeth T2 to T7 and T9 to T14. That is, the first system excitation winding R1 is wound around the first system tooth T1, while the first system excitation windings R2 to R7, the first first system output windings Sa2 to Sa7, and the second first system output windings Sb2 to Sb7 are wound around the first system teeth T2 to T7.

In the same way, the second system excitation winding R8 is wound around the second system tooth T8, while the second system excitation windings R9 to R14, the first second system output windings Sa9 to Sa14, and the second second system output windings Sb9 to Sb14 are wound around the second system teeth T9 to T14.

By configuring in this way, there is no place in which output windings of the first system and the second system are disposed neighboring, because of which an advantage can be obtained in that magnetic interference is restricted, whereby angle detection accuracy is improved.

Figure 18:
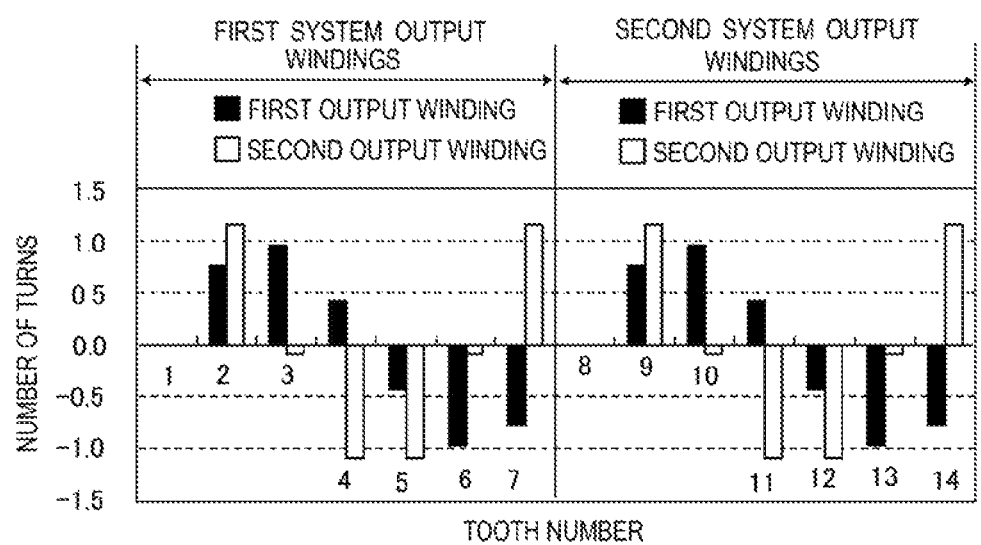
FIG. 18 is a drawing showing numbers of turns of output windings of the redundant resolver according to the fifth embodiment of the embodiment.

FIG. 18 is a drawing showing a turn number distribution of the first first system output windings Sa2 to Sa7, the second first system output windings Sb2 to Sb7, the first second system output windings Sa9 to Sa14, and the second second system output windings Sb9 to Sb14 according to the fifth embodiment.

Herein, in FIG. 18, the numbers of turns of the output windings wound around the first system teeth T1 to T7 and the second system teeth T8 to T14, including the auxiliary teeth T1 and T8, are shown consecutively. Also, the numbers of turns are standardized by the number of turns when not having the auxiliary teeth T1 and T8.

The first first system output windings Sa2 to Sa7 and the second first system output windings Sb2 to Sb7 of the resolver 2 according to the fifth embodiment are designed so that when the number of turns of both of the auxiliary teeth T1 and T8 is zero, the phase difference is 90°, and the amplitudes are equal. Because of this, the number of turns amplitudes appear to differ. In the same way, the first second system output windings Sa9 to Sa14 and the second second system output windings Sb9 to Sb14 are designed so that when the number of turns of both of the auxiliary teeth T1 and T8 is zero, the phase difference is 90°, and the amplitudes are equal. Because of this, the number of turns amplitudes appear to differ.

By configuring in this way, an output signal can be of a sinusoidal waveform, because of which an advantage can be obtained in that angle detection accuracy is improved.

Sixth Embodiment

Next, a rotation angle detection device in which a redundant resolver according to a sixth embodiment of the invention is used will be described.

Figure 19:
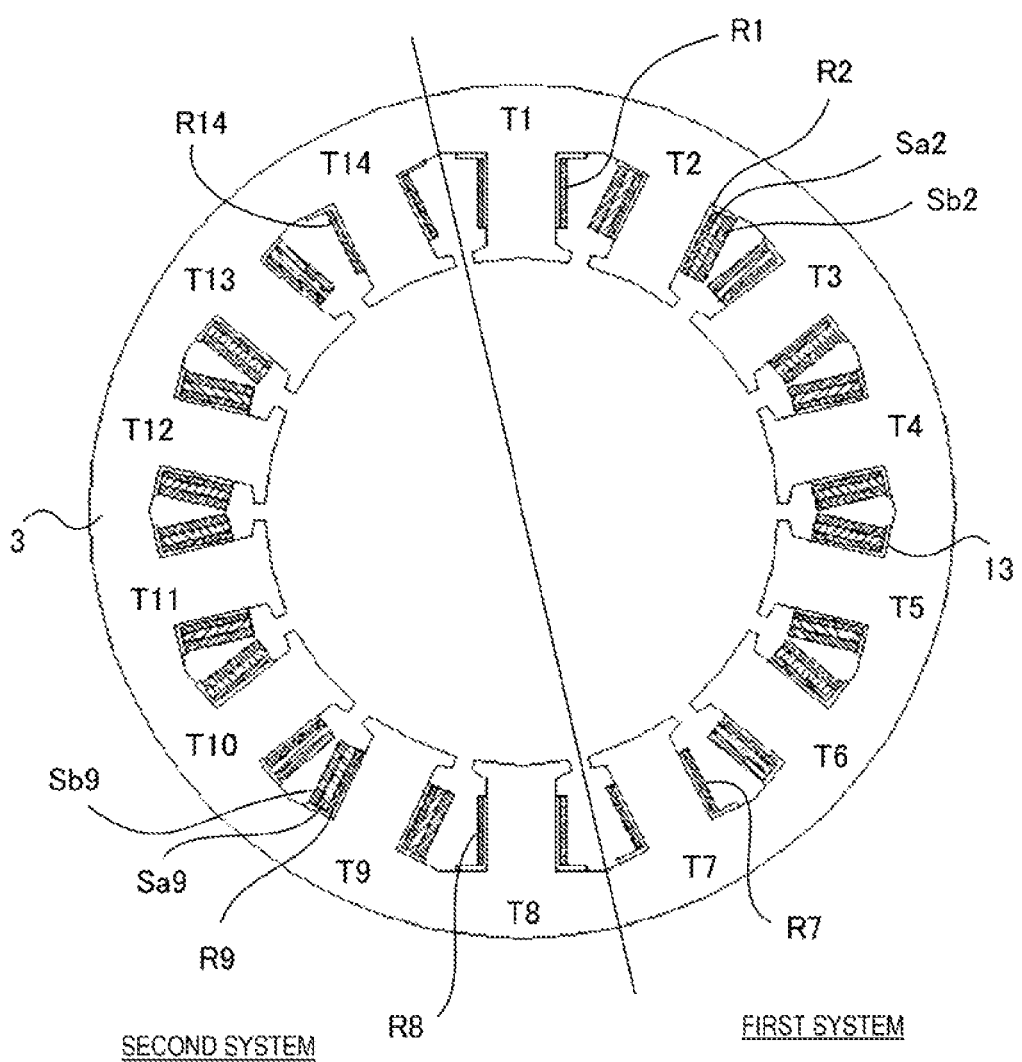
FIG. 19 is a sectional view of a stator of a redundant resolver according to a sixth embodiment of the invention.

FIG. 19 is a sectional view showing the stator 3 of the resolver 2 used in the rotation angle detection device according to the sixth embodiment.

The teeth T1 to T14 of the stator 3 according to the sixth embodiment are divided in two in the circumferential direction, configuring a first system and a second system, whereby a dual system redundant resolver is configured. That is, the total angle of teeth per system is 360°/2=180°.

The teeth T1 to T7 of the stator 3 are the first system teeth, and the teeth T8 to T14 of the stator 3 are the second system teeth. Of the first system teeth T1 to T7 and the second system teeth T8 to T14, the teeth T1, T7, T8, and T14 are auxiliary teeth around which only an excitation winding is wound, with no output winding being wound. A one-phase excitation winding and a two-phase output winding are wound around the other teeth T2 to T6 and T9 to T13. That is, the first system excitation windings R1 and R7 are wound around the first system teeth T1 and T7, while the first system excitation windings R2 to R6, the first first system output windings Sa2 to Sa6, and the second first system output windings Sb2 to Sb6 are wound around the first system teeth T2 to T6.

In the same way, the second system excitation windings R8 and R14 are wound around the second system teeth T8 and T14, while the second system excitation windings R9 to R13, the first second system output windings Sa9 to Sa13, and the second second system output windings Sb9 to Sb13 are wound around the second system teeth T9 to T13.

By configuring in this way, a tooth that has no output winding is disposed at either end of the teeth around which the first system and second system output windings are wound, and there is no place in which output windings of the first system and the second system are disposed neighboring, because of which an advantage can be obtained in that magnetic interference is restricted, whereby angle detection accuracy is further improved.

Figure 20:
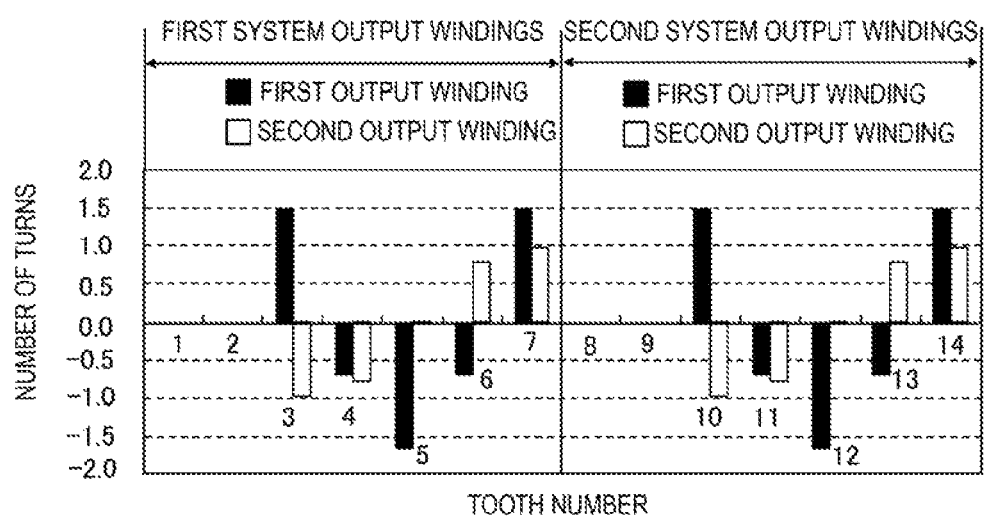
FIG. 20 is a drawing showing numbers of turns of output windings of the redundant resolver according to the sixth embodiment of the embodiment.

FIG. 20 is a drawing showing a turn number distribution of the first first system output windings Sa1 to Sa7, the second first system output windings Sb1 to Sb7, the first second system output windings Sa8 to Sa14, and the second second system output windings Sb8 to Sb14 according to the sixth embodiment.

Herein, in FIG. 20, the numbers of turns of the output windings wound around the first system teeth T2 to T6 and the second system teeth T9 to T13, including the auxiliary teeth T1, T7, T8, and T14, are shown consecutively. Also, the numbers of turns are standardized by the number of turns when not having the auxiliary teeth T1, T7, T8, and T14.

The first first system output windings Sa1 to Sa7 and the second first system output windings Sb1 to Sb7 of the resolver 2 according to the sixth embodiment are designed so that when the number of turns of both of the auxiliary teeth T1 and T7 is zero, the phase difference is 90°, and the amplitudes are equal. Because of this, the number of turns amplitudes appear to differ. In the same way, the first second system output windings Sa8 to Sa14 and the second second system output windings Sb8 to Sb14 are designed so that when the number of turns of both of the auxiliary teeth T8 and T14 is zero, the phase difference is 90°, and the amplitudes are equal. Because of this, the number of turns amplitudes appear to differ.

By configuring in this way, an output signal can be of a sinusoidal waveform, because of which an advantage can be obtained in that angle detection accuracy is improved.

Multiple embodiments of the invention are described above, but the invention not being limited to this, the embodiments can be freely combined, and each embodiment can be modified or abbreviated as appropriate, without departing from the scope of the invention.

REFERENCE SIGNS LIST 1 angle computing unit, 1*a* first system angle computing unit, 1*b* second system angle computing unit, 2 redundant resolver, 3 stator, 4 rotor, 5 winding, 6 shaft, 7 rotating electrical machine, 8 extended portion, 9*a*, 9*b* output terminal, 10 first system excitation circuit, 11 second system excitation circuit, 12 abnormality determiner, 13 insulator, 100 rotation angle detection device, T1 to T14 tooth, R1 to R14 excitation winding, Sa1 to Sa14, Sb1 to Sb14 output winding, B1 first system first block, B2 second system first block, B3 first system second block, B4 second system second block.

What is claimed is:

1. A redundant resolver comprising a rotor and a stator that form a pair, wherein
the rotor is a rotor with a shaft angle multiplier of Nx having Nx (Nx is a natural number) salient poles,
the stator is such that n teeth, where n is a natural number, are disposed sequentially in a circumferential direction, configuring M systems by being divided into M in the circumferential direction, and having an angle of 360/M degrees when angles of the teeth configuring one system are totaled,
a one-phase excitation winding and a two-phase output winding are wound around each of the n teeth, excitation signals of the same frequency are applied by differing excitation circuits to the respective excitation windings, an output order per system is Nout (Nout is a natural number), and
an abnormality is detected based on output signals of the M systems.

2. The redundant resolver according to claim 1, wherein, when a failure occurs in one portion of the M systems, the excitation signal of the system in which the failure has occurred is stopped.

3. The redundant resolver according to claim 1, wherein an excitation order per system is Ne±0.5 (Ne is a natural number), and the shaft angle multiplier of the rotor is an odd number.

4. The redundant resolver according to claim 1, wherein an excitation order per system is Ne±(Ne is a natural number), and the shaft angle multiplier of the rotor is an even number.

5. The redundant resolver according to claim 1, wherein an offset of each output signal of the M systems is corrected.

6. The redundant resolver according to claim 1, wherein a phase difference between the excitation signals is within 60°.

7. The redundant resolver according to claim 1, wherein the excitation signals are synchronized.

8. The redundant resolver according to claim 1, wherein M is two.

9. The redundant resolver according to claim 1, wherein the output windings of a first system and a second system are wound in the same direction or in mutually opposing directions.

10. The redundant resolver according to claim 1, wherein, when an angle detected by the first system is θ1 and an angle detected by the second system is θ2, it is determined that there is an abnormality when |θ1−θ2|>α or |θ1+θ2|>β (note that α and β are real numbers).

11. The redundant resolver according to claim 1, wherein two systems are disposed at intervals of 180° in the circumferential direction.

12. The redundant resolver according to claim 1, wherein two systems are disposed at intervals of 90° in the circumferential direction.

13. A rotation angle detection device, comprising:
the redundant resolver according to claim 1; and
an angle computing unit, connected to an output terminal of the redundant resolver, that calculates and outputs a detected angle of the rotor based on an output voltage of output windings of the redundant resolver.

14. The redundant resolver according to claim 1, wherein an auxiliary tooth around which no output winding is wound is disposed in an end portion of a tooth block that is a series of teeth configuring one system.

15. The redundant resolver according to claim 14, wherein amplitudes of numbers of turns of the two-phase output winding wound around one system differ.

* * * * *